United States Patent [19]

Nakagawa et al.

[11] Patent Number: 5,748,606

[45] Date of Patent: May 5, 1998

[54] OPTICAL DISC PLAYER DEVICE WITH A VIBRATION PREVENTION MECHANISM

[75] Inventors: Yoshiaki Nakagawa, Yokohama; Takashi Suzuki, Tokyo; Seiji Nakama, Yokohama; Masataka Kaneda, Machida; Masakazu Kashikawa, Yokohama; Satoshi Kawata, Yokohama; Shunichi Iida, Yokohama; Hiroto Nishida, Ishikawa-ken; Hiroyuki Matsuda, Yokohama, all of Japan

[73] Assignee: Matsushita Electric Industrial Co., Ltd., Kadoma, Japan

[21] Appl. No.: 400,012

[22] Filed: Mar. 6, 1995

Related U.S. Application Data

[63] Continuation of Ser. No. 880,680, May 8, 1992.

[30] Foreign Application Priority Data

Jun. 6, 1991 [JP] Japan .................. 3-134846
Jun. 6, 1991 [JP] Japan .................. 3-134847

[51] Int. Cl.[6] ........................................ G11B 17/08
[52] U.S. Cl. ................................................ 369/271
[58] Field of Search .............................. 369/270, 271, 369/292, 290, 268, 291; 360/99.12

[56] References Cited

U.S. PATENT DOCUMENTS

| | | | |
|---|---|---|---|
| 4,740,937 | 4/1988 | Watanabe | 369/271 |
| 4,829,501 | 5/1989 | Seto et al. | 369/75.2 |
| 4,841,518 | 6/1989 | Nozu et al. | 369/270 |
| 4,890,276 | 12/1989 | Ono et al. | 369/270 |
| 4,951,277 | 8/1990 | Masunaga et al. | 369/270 |
| 5,050,158 | 9/1991 | Kitada et al. | 369/270 |
| 5,109,372 | 4/1992 | Caspers et al. | 369/77.1 |
| 5,119,357 | 6/1992 | Tsuruta et al. | 369/77.1 |

FOREIGN PATENT DOCUMENTS

| | | | |
|---|---|---|---|
| WO 85/01607 | 4/1985 | European Pat. Off. . | |
| 0 287 153 | 4/1988 | European Pat. Off. . | |
| 0 356 984 | 8/1989 | European Pat. Off. . | |
| 1040275 | 10/1958 | Germany | 369/268 |
| 2121152 | 5/1990 | Japan | 369/270 |
| 787108 | 12/1957 | United Kingdom | 369/268 |

*Primary Examiner*—Stuart S. Levy
*Assistant Examiner*—David D. Davis
*Attorney, Agent, or Firm*—Reid & Priest L.L.P.

[57] ABSTRACT

A disc player device includes a tray transfer mechanism for transferring a tray, supporting a disc thereon, from a magazine, a clamper for holding the disc, and a clamper drive mechanism for transferring the clamper to a turntable. The disc is held by the turntable with the clamper transfer mechanism held out of contact with the clamper, and in this condition a playback of the disc is carried out. After the playback of the disc is finished, the disc is again clamped, and is returned to a predetermined position by the clamper transfer mechanism. The tray transfer mechanism, the clamper, the clamper drive mechanism are driven by a common motor.

6 Claims, 14 Drawing Sheets

OPTICAL DISC PLAYER DEVICE WITH A VIBRATION PREVENTION MECHANISM

This application is a continuation of U.S. patent application Ser. No. 07/880,680, filed May 8, 1992.

BACKGROUND OF THE INVENTION

This invention relates to a disc player device in which a desired disc is drawn from a magazine containing a plurality of discs (e.g., compact optical discs), and then is held between a turntable and a clamper, and reproduction (playback) is effected while rotating the turntable.

In a conventional disc player device, a clamper pivotally supported on a clamp arm is urged toward a turntable to hold a disc between the clamper and the turntable, and the turntable is rotated to rotate the disc, thereby reading data from the disc through an optical pickup.

Another conventional disc player device uses a magazine containing a plurality of trays each having a disc placed thereon. The tray having a desired disc is drawn from the magazine by a tray transfer mechanism, and this disc on the drawn tray is held between a turntable and a clamper, and the disc is rotated by the turntable, thereby effecting the playback of the disc. Various kinds of control mechanisms for this type of disc player device have been proposed. One example of these control mechanisms uses two separate motors for driving the tray transfer mechanism and a clamper drive mechanism, respectively. Another example employs a common motor, and the driving force of this motor is transmitted selectively to the tray transfer mechanism or the clamper drive mechanism by means of a plunger switch mechanism.

In the conventional disc player devices, however, at the time of the playback of the disc, since the rotating clamper and the clamp arm are mechanically connected together, vibrations of the optical pickup produced during a focus servo operation are transmitted to the disc via a base plate, the clamp arm and the clamper to thereby vibrate the disc, and in response to the vibration of the disc, a vibration loop for the focus servo operation is formed, so that an oscillating condition develops, which results in a failure in the focus servo operation.

With respect to the type of disc player device using the separate motors for driving the tray transfer mechanism and the clamper drive mechanism, respectively, the cost is high because of the use of the two motors, and a control circuitry is complicated. With respect to the type of disc player device using the common motor as the drive source, the mechanism becomes large because of the use of the plunger, and besides the cost is high.

SUMMARY OF THE INVENTION

With the above problems of the prior art in view, it is an object of this invention to provide a disc player device which is capable of preventing a failure in focus servo due to vibration of an optical pickup.

Another object of the invention is to provide a disc player device which can stably clamp a disc with a simple construction even when external vibrations are applied.

A further object of the invention is to provide a disc player device in which a tray transfer mechanism and a clamper drive mechanism can be driven by a common rotation drive source, and a switch mechanism for switching the rotation drive force is simple in construction, thereby reducing the cost of the disc player device.

According to a first aspect of the present invention, there is provided a disc player device comprising:
  clamper transfer means for transferring a clamper for supporting a disc thereon; and
  a turntable for attracting the clamper, transferred to the turntable, by a magnetic attractive force to thereby hold the disc between the clamper and the turntable; wherein
  after the clamper transfer means transfers the clamper to the turntable, the clamper transfer means is disengaged from the clamper to be disposed out of contact therewith.

According to a second aspect of the invention, there is provided a disc player device comprising:
  slide means slidably mounted on a base plate;
  pivotal means pivotally movable in response to the sliding movement of the slide means so as to move toward and away from the base plate;
  a pair of holder arm means mounted on the pivotal means, the pair of holder arm means being movable toward each other to hold a clamper therebetween, and movable away from each other to release the clamper; and
  opening/closing means for moving the pair of holder arms toward and away from each other in response to the sliding movement of the slide means.

According to a third aspect of the invention, there is provided a disc player device comprising:
  a clamper for supporting a disc thereon;
  clamper transfer means for transferring the clamper;
  a turntable for attracting the clamper, transferred to the turntable, by a magnetic attractive force to thereby hold the disc between the clamper and the turntable; and
  urging means for urging the disc against the clamper during the transfer of the clamper to the turntable by the clamper transfer means; wherein
  after the clamper transfer means transfers the clamper to the turntable, the clamper transfer means is disengaged from the clamper to be disposed out of contact therewith, and also the urging means is brought out of contact with the disc. According to a fourth aspect of the invention, there is provided a disc player device comprising:
  a pin for being inserted into a hole formed in a central portion of a clamper so as to hold the clamper;
  clamper transfer means for transferring the clamper for supporting a disc thereon; and
  a turntable for attracting the clamper, transferred to the turntable, by a magnetic attractive force to thereby hold the disc between the clamper and the turntable; wherein after the clamper is disengaged from the turntable, the pin is inserted into the hole in the clamper.

According to a fifth aspect of the invention, there is provided a disc player device comprising:
  a magazine for containing a plurality of trays each having a disc placed thereon;
  tray transfer means for transferring the tray;
  a clamper cooperating with a turntable so as to hold the disc on the tray, transferred by the tray transfer means, between the clamper and the turntable;
  clamper drive means for moving the clamper to the turntable;
  a rotation drive source;
  switch means capable of switching between a first condition for transmitting a rotation drive force of the rotation drive source to the tray transfer means and a second condition for transmitting the rotation drive force to the clamper drive means, the switching of the switch means being effected by a movable portion of the tray transfer means.

In the first aspect of the invention, when the clamper is transferred to the turntable by the clamper transfer means, the clamper is magnetically attracted by the turntable so as to hold the disc between the turntable and the clamper by this magnetic attractive force. In this disc-clamped condition, the clamper transfer means is disposed apart from and out of contact with the clamper, and only the clamper is attracted by the turntable by the magnetic attractive force to hold the disc therebetween, and in this condition the playback of the disc is carried out. After the playback is finished, the clamper is disengaged from the turntable by the clamper transfer means.

In the second aspect of the invention, when the slide plate (slide means) slides, the opening/closing means held on the pivotal means is pivotally moved to move the pair of holder arm means toward or away from each other to hold the clamper therebetween or to release the clamper. In response to the sliding movement of the slide plate, the pivotal means is pivotally moved, so that the pair of holder arm means held on a pivotal plate moves upward or downward to transfer the clamper.

In the third aspect of the invention, during the time when the clamper having the disc placed thereon is transferred by the clamper transfer means, the urging pieces (urging means) urge the disc against the clamper to prevent the disc from being disengaged from the clamper. After the disc is transferred to the turntable, the urging pieces are brought out of contact with the disc.

In the fourth aspect of the invention, after the clamper is disengaged from the turntable, the pin is inserted into the hole in the clamper. With this arrangement, the clamper is positively held, and besides the disc placed on the clamper is introduced into a predetermined position within the tray.

In the fifth aspect of the invention, the rotation drive force of the common rotation drive source can be transmitted to a selected one of the tray transfer means and the clamper drive means via the switch means, thereby driving the same. When the movable portion of the tray transfer means arrives at a predetermined position, the switching of the switch means is effected by this movable portion.

DESCRIPTION OF THE PREFERRED EMBODIMENT

Figure 1:
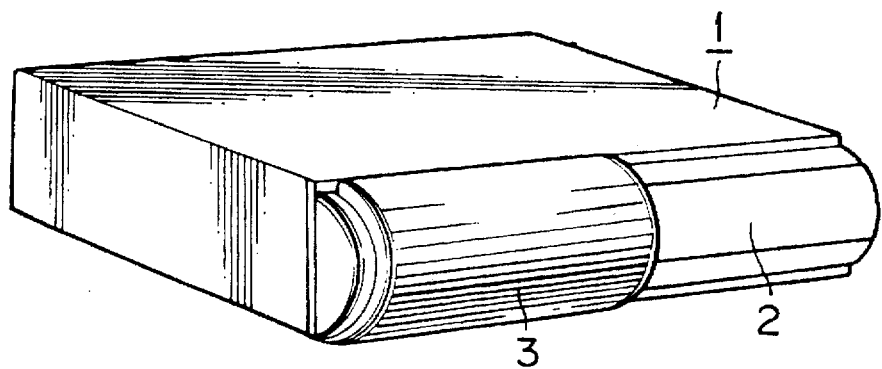
FIG. 1 is a perspective view of a disc player device of the present invention.

FIG. 1 shows one preferred embodiment of a disc player device of the present invention. A box-like casing 1 has a magazine insertion port provided at a left side portion of a front face 2 thereof. A slide lid 3 is mounted on the front face 2 of the casing 1 for sliding movement in right and left directions so as to open and close the magazine insertion port. In the condition shown in FIG. 1, the slide lid 3 is disposed at the left side of the front face 2 to close the magazine insertion port.

Figure 2:
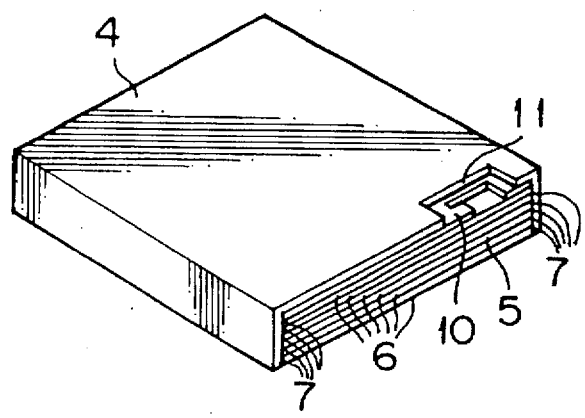
FIG. 2 is a perspective view of a magazine used in the disc player device.
Figure 3:
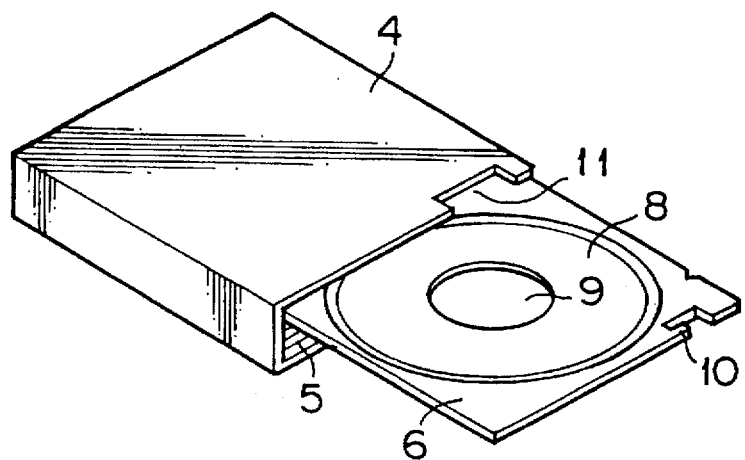
FIG. 3 is a view similar to FIG. 2, but showing a tray as drawn from the magazine.

FIGS. 2 and 3 show a magazine for containing a plurality of compact discs. The magazine comprises a box-like body 4 having an opening 5 formed at one side face thereof. Formed on the inner surfaces of the magazine body 4 are a plurality of parallel guide pieces 7 for guiding trays 6. A recess 8 for receiving the compact disc is formed in the upper surface of the tray 6, and a hole 9 is formed through the central portion of the recess 8. An engagement piece 10 is formed at the front edge of the tray 6, and a pawl of a tray transfer mechanism is engaged with the engagement piece 10 so as to move the tray 6 from and into the magazine body 4. A notch 11 is formed in the magazine body 4. In FIG. 1, the slide lid 3 is slidingly moved in the right-hand direction to open the magazine insertion port, and the magazine shown in FIG. 2 is inserted into the magazine insertion port. The magazine shown in FIG. 2 is received in the left side portion of the casing 1 shown in FIG. 1, and the tray transfer mechanism movable upward and downward, a turntable for rotating the compact disc, a clamp mechanism for clamping the compact disc to the turntable, and an optical pickup for reading data recorded in the compact disc are received in the right side portion of the casing 1.

Figure 4:
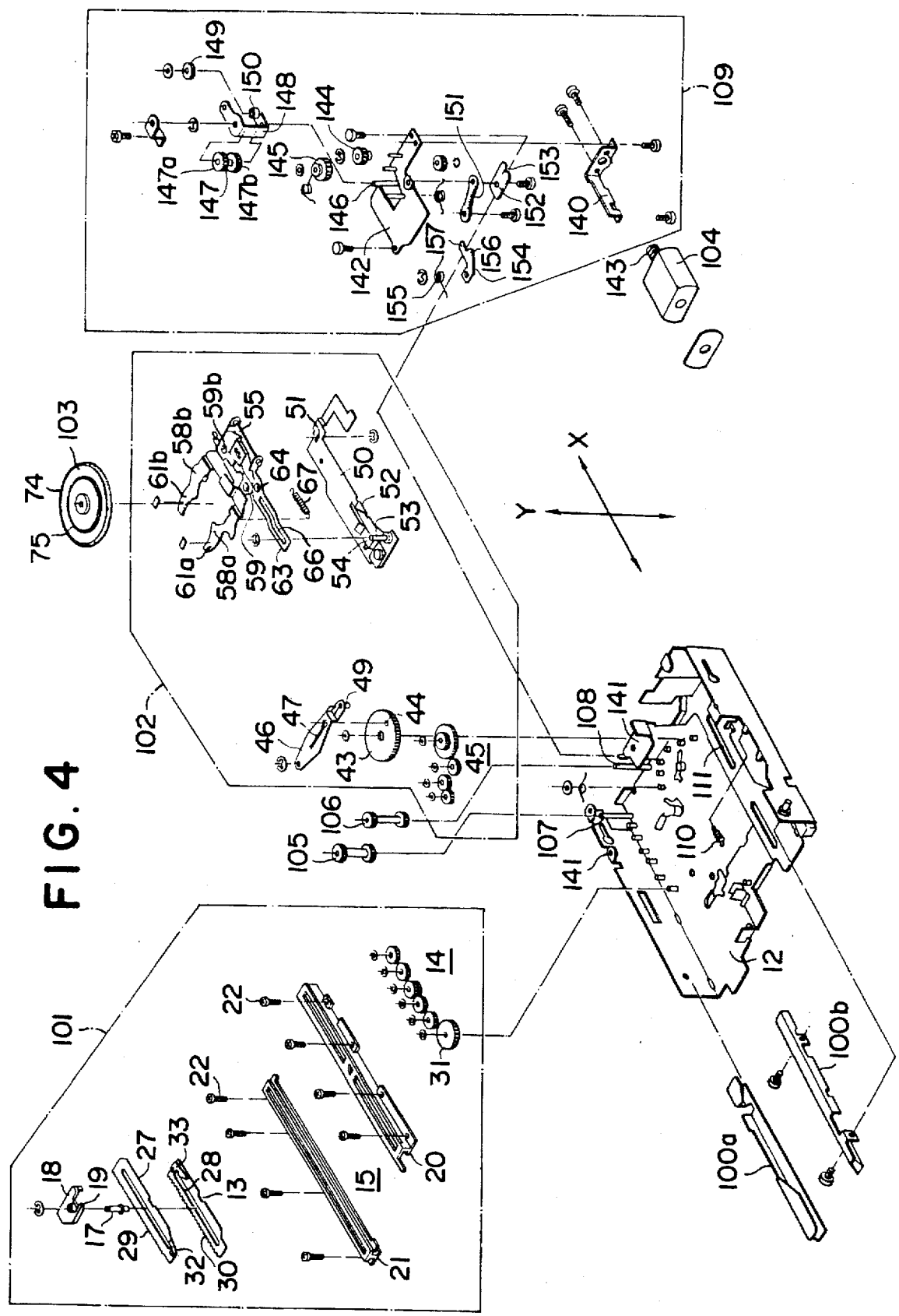
FIG. 4 is an exploded perspective view of important portions of the disc player device.

FIG. 4 shows important portions of the disc player device of the invention in an exploded manner. An elevator plate 12 is supported within the casing 1 so as to move in a direction of arrow Y in FIG. 4. Tray guide members 100a and 100b are mounted on opposite side walls of the elevator plate 12, respectively. The tray 6 drawn from the magazine is guided by the tray guide members 100a and 100b, and is moved or transferred in a direction of arrow X to the upper surface of the elevator plate 12. The tray transfer mechanism 101 has the pawl 19 engageable with the engagement piece 10 of the tray 6, and moves the tray 6 in the direction of arrow X. The tray transfer mechanism 101 is mounted on the elevator plate 12. A clamper drive mechanism 102 is operable to hold a clamper 103, to release the holding of the clamper 103 and to move the thus held clamper 103 upward or downward. The clamper drive mechanism 102 is mounted on the elevator plate 12. A motor 104 drives the tray transfer mechanism 101 and the clamper drive mechanism 102 by its rotation drive force. Gears 105 and 106 are rotatably supported respectively by shafts 107 and 108 formed on the elevator plate 12. A switch mechanism 109 transmits the rotation drive force of the motor 104 to the tray transfer mechanism 101 through the gear 105, and also transmits this rotation drive force to the clamper drive mechanism 102 through the gear 106. The switch mechanism 109 is mounted on the elevator plate 12.

Figure 5:
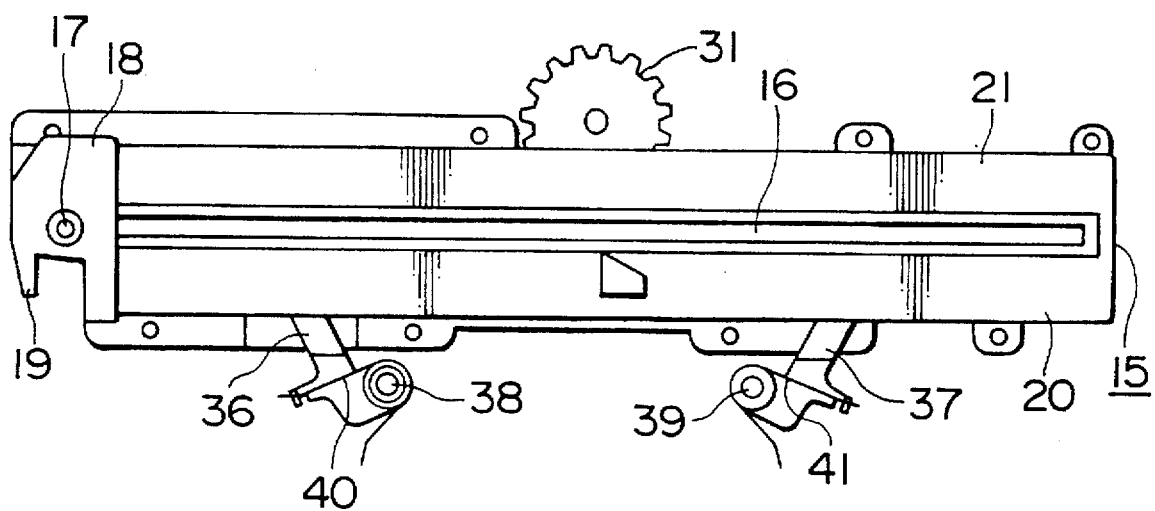
FIG. 5 is a top plan view of a tray transfer mechanism of the disc player device.
Figure 7:
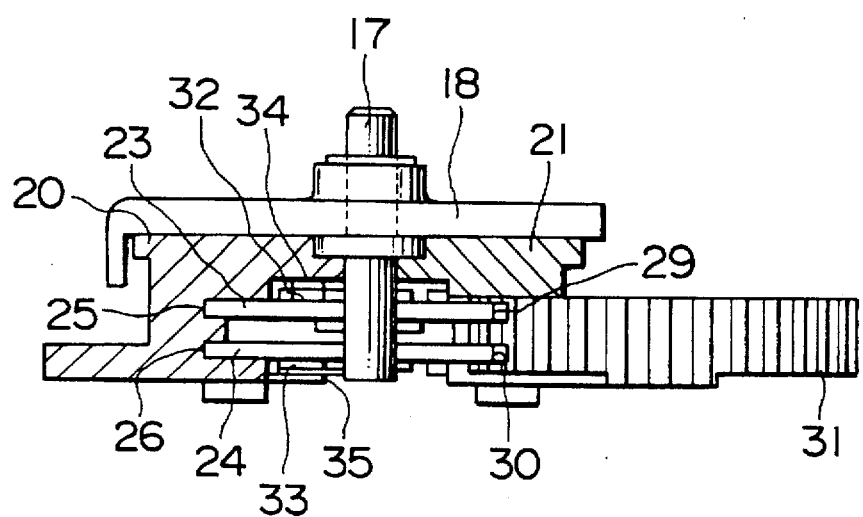
FIG. 7 is a side-elevational view of the tray transfer mechanism.
Figure 6:
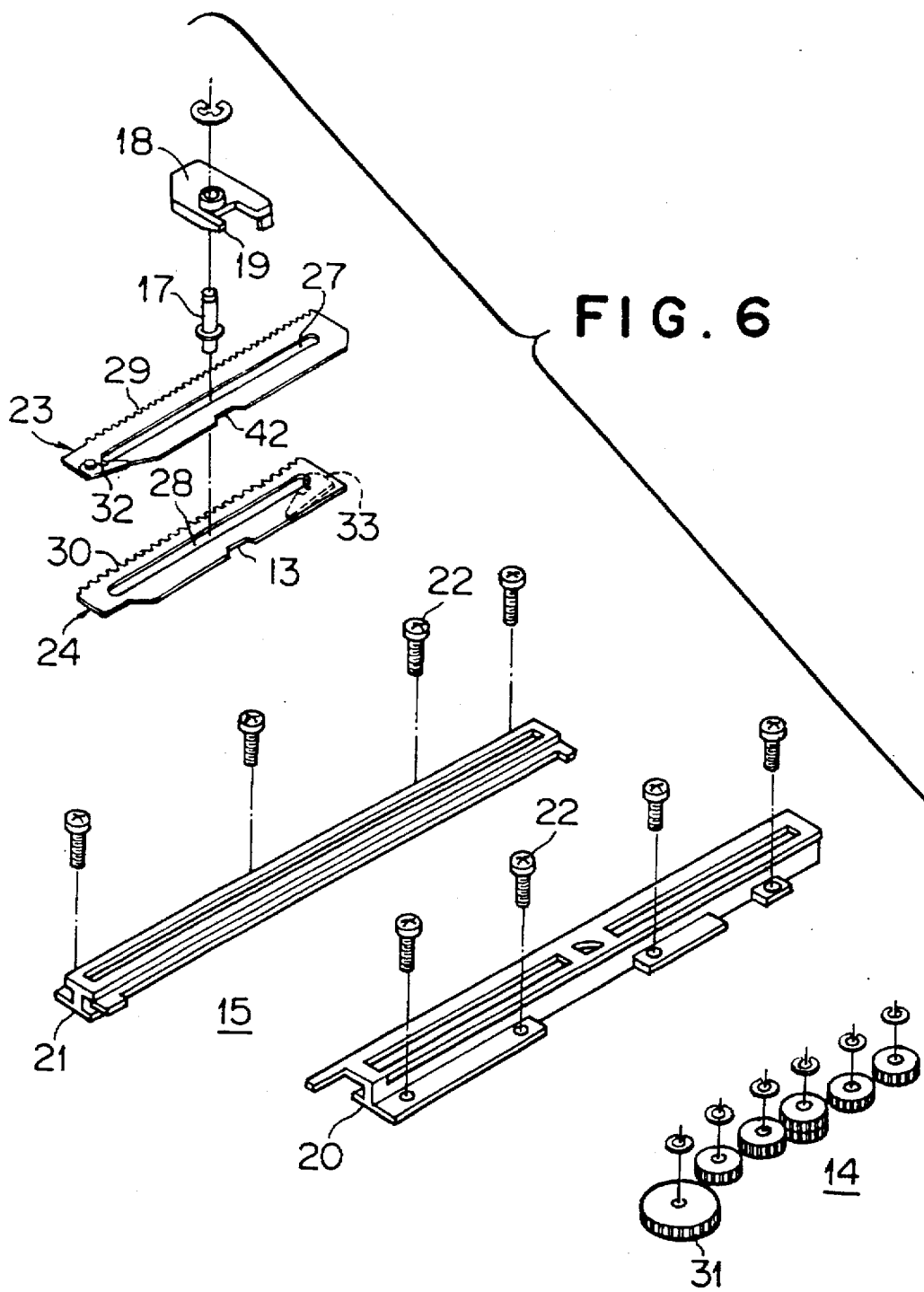
FIG. 6 is an exploded perspective view of the tray transfer mechanism.

The tray transfer mechanism 101 in this embodiment will now be described with reference to FIGS. 5 to 7. First and second guide pieces 20 and 21 constitute a guide member 15, and are secured to the upper surface of the elevator plate 12 by screws 22. A guide hole 16 is formed between the first guide piece 20 and the second guide piece 21. First and second rack plates 23 and 24 are guided by two guide grooves 25 and 26, formed in the guide pieces 20 and 21, to slidingly move in the direction of arrow X. Slots 27 and 28 are formed through the rack plates 23 and 24, respectively, and a pin 17 is received in the slots 27 and 28. Teeth 29 and 30 are formed on the side edges of the rack plates 23 and 24, respectively, and are meshingly engageable with a final-stage gear 31 of a gear train 14, the gears of the gear train 14 being rotatably supported on the elevator plate 12. An engagement pawl 32 is pivotally supported on the upper surface of the rack plate 23 at one end thereof (the left end in FIG. 6). An engagement pawl 33 is pivotally supported on the lower surface of the rack plate 24 at one end thereof (the right end in FIG. 6). The engagement pawls 32 and 33 are guided respectively by guide surfaces 34 and 35 (see FIG. 7), formed in the guide pieces 20 and 21, and are pivotally moved so as to be engaged with and disengaged from the pin 17. A slide member 18 has the pawl 19 engageable with the engagement piece 10 of the tray 6. In FIG. 5, lock pieces 36 and 37 are pivotally supported by respective shafts 38 and 39 on the upper surface of the elevator plate 12. Springs 40 and 41 urge the lock pieces 36 and 37, respectively. The lock pieces 36 and 37 are engaged respectively in notches 42 and 13, formed respectively in the rack plates 23 and 24, to lightly lock the rack plates 23 and 24. In response to the rotation of the gear 31, the tray transfer mechanism slidingly moves the slide member 18 between the left and right ends of the guide hole 16 (FIG. 5). In response to this sliding movement, the tray 6 with which the pawl 19 of the slide member 18 is engaged is drawn from and introduced into the magazine.

Figure 8A:
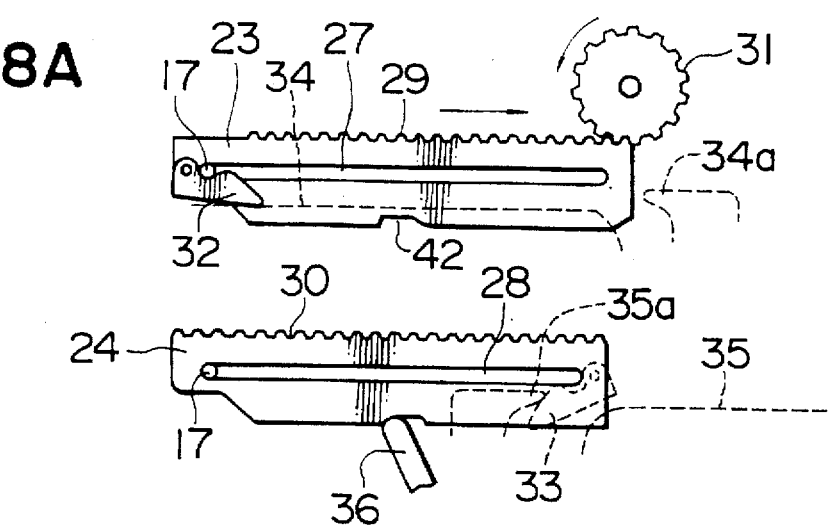
FIGS. 8A to 8C are views explanatory of the operation of the tray transfer mechanism.

Next, the operation of the tray transfer mechanism will now be described with reference to FIGS. 8A, 8B and 8C. Although the rack plates 23 and 24 are disposed in vertically overlapping relation to each other in FIG. 7, these rack plates are shown in non-overlapping relation in FIGS. 8A, 8B and 8C. In FIG. 8A, the slide member 18 is positioned close to the magazine, as shown in FIG. 5. In this condition, the engagement pawl 32 of the first rack plate 23 has been pivotally moved counterclockwise by the guide surface 34, and the pin 17 is held between the engagement pawl 32 and the left end of the slot 27. Therefore, when the gear 31 rotates counterclockwise, the first rack plate 23 in mesh with this gear 31 slides in the right-hand direction, so that the pin 17 also moves together with the rack plate 23 in the right-hand direction. Since the pin 17 is received in the hole in the slide member 18, the slide member 18 moves in the right-hand direction as the pin 17 moves in the right-hand direction, so that the tray 6 with which the pawl 19 of the slide member 18 is engaged is drawn from the magazine. In this case, since the second rack plate 24 is not in mesh with the gear 31, the second rack plate 24 remains stationary when the first rack plate 23 moves in the right-hand direction.

Figure 8B:
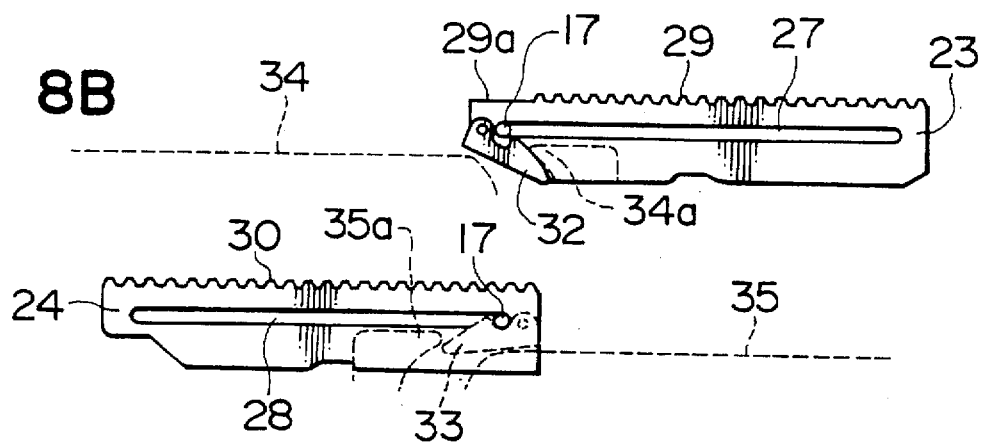
Figure 8C:
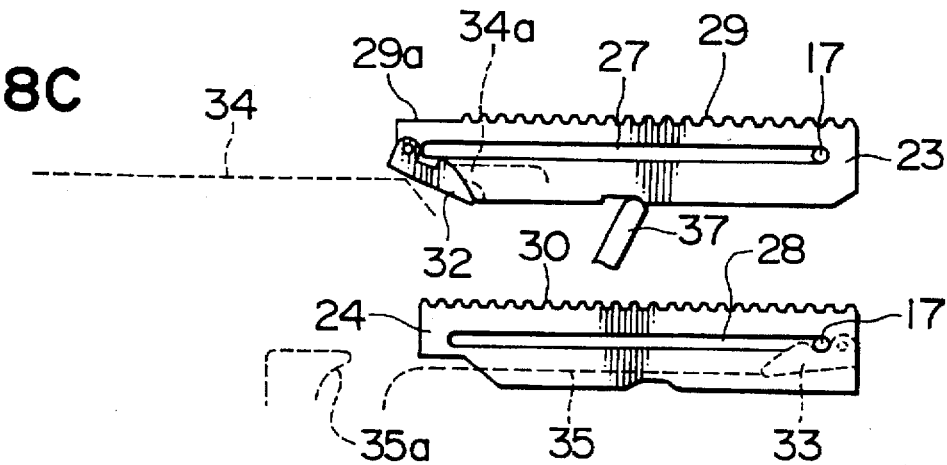

When the first rack plate 23 further moves in the right-hand direction, the engagement pawl 32 supported on the first rack plate 23 abuts against a projection 34a on the guide surface 34, and is pivotally moved clockwise to be disengaged from the pin 17, as shown in FIG. 8B. Also, when the first rack plate 23 reaches the position shown in FIG. 8B, the gear 31 and the rack plate 23 are disengaged from each other, and therefore the driving of the first rack plate 23 by the gear 31 is finished. Reference numeral 29a denotes a non-toothed portion of the rack plate 23. During the movement of the first rack plate 23 from the position of FIG. 8A to the position of FIG. 8B, the pin 17 moves right along the slot 28 of the second rack plate 24, and is abutted against the right end of this slot 28, so that the second rack plate 24 is moved by the pin 17 in the right-hand direction, and the second rack plate 24 is meshed with the gear 31, and the engagement pawl 33 supported on the second rack plate 24 is pivotally moved clockwise by the guide surface 35. Therefore, the pin 17 is held between the engagement pawl 33 and the right end of the slot 28. In this manner, the meshing engagement of the gear 31 is switched from the first rack plate 23 to the second rack plate 24, and the engagement of the pin 17 is switched from the first rack plate 23 to the second rack plate 24. After the condition shown in FIG. 8B is obtained, the second rack plate 24 is slidingly moved in the right-hand direction by the rotation drive force of the gear 31 to further move the pin 17 in the right-hand direction. When the second rack plate 24 reaches a position shown in FIG. 8C, a switch (not shown) is operated by the slide member 18 to stop the rotation of the motor 104, thereby stopping the movement of the second rack plate 24. As described above, the pin 17 is driven to be moved from the left end shown in FIG. 8A to the right end shown in FIG. 8C, and the tray 6 is drawn from the magazine by the slide member 18 engaged with the pin 17. For introducing or returning the tray 6 into the magazine, the above tray drawing operation is reversed, and in this case, by rotating the gear 31 clockwise, the operation proceeds in the sequence of the conditions of FIGS. 8C, 8B and 8A.

Next, the clamper drive mechanism 102 in this embodiment will now be described with reference to FIGS. 9 to 11. A gear 43 is rotatably supported on the elevator plate 12, and an eccentric pin 44 is formed on the upper surface of the gear 43 in eccentric relation thereto. A gear train 45 transmits the rotation drive force of the motor 104 to the gear 43, and the rotation drive force of the motor 104 is transmitted to the gear 43 via the gear train 45 so as to rotate the gear 43 counterclockwise. A pivotal arm 46 has a slot 47 in which the eccentric pin 44 is received, and the pivotal arm 46 is pivotally supported by a shaft 48 mounted on the elevator plate 12. A pin 49 is formed on one end of the pivotal arm 46. A slide plate 50 is mounted on the elevator plate 12 for sliding movement in the direction of arrow X. A pin formed on the lower surface of the slide plate 50 is received in a straight slot 111 formed through the elevator plate 12, and is moved along the slot 111, so that the slide plate 50 slides over the elevator plate 12 in the direction of arrow X. The pin 49 of the pivotal arm 46 is received in a slot 51 formed through the slide plate 50, and the pivotal arm 46 and the slide plate 50 are connected together through this pin 49. A drive piece 52 of a triangular shape is formed integrally on the edge of the slide plate 50, and is projected upwardly. A pin 53 is formed on one end of the slide plate 50, and a limitation piece 54 is provided on the slide plate 50, the limitation piece 54 being formed by stamping and raising part of the slide plate 50. A pivotal base plate 55 has bent pieces 55a and 55b which are formed respectively at opposite sides thereof and bent upwardly. Shaft 56a and 56b are formed on the bent pieces 55a and 55b, respectively. Support pieces 57a and 57b are provided on the elevator plate 12, the support pieces 57a and 57b being formed by stamping and raising part of the elevator plate 12. The shafts 56a and 56b of the bent pieces 55a and 55b are received respectively in holes formed respectively in the support pieces 57a and 57b. The pivotal base plate 55 is supported by the support pieces 57a and 57b so as to be pivotally moved. The pivotal base plate 55 is urged toward the elevator plate 12 by a spring 110. Holder arms 58a and 58b are pivotally mounted on the upper surface of the pivotal base plate 55 by respective shafts 59a and 59b. Holder portions 61a and 61b of an arcuate shape for holding the clamper 103 therebetween are formed at the distal ends of the holder arms 58a and 58b, respectively. A slot 62 is formed through a projection formed on the other end of each of the holder arms 58a and 58b. An arm 63 is pivotally supported by a shaft 64 on the pivotal base plate 55. A pin 65 is formed on one end of the arm 63, and is received in the slots 62 formed respectively through the holder arms 58a and 58b. A bent slot 66 is formed through the arm 63, and the pin 53 formed on the slide plate 50 is received in the bent slot 66. Opposite ends of a spring 67 are retained on the holder arms 58a and 58b, respectively, and the holder arms 58a and 58b are urged toward each other by this spring 67.

Figure 11:
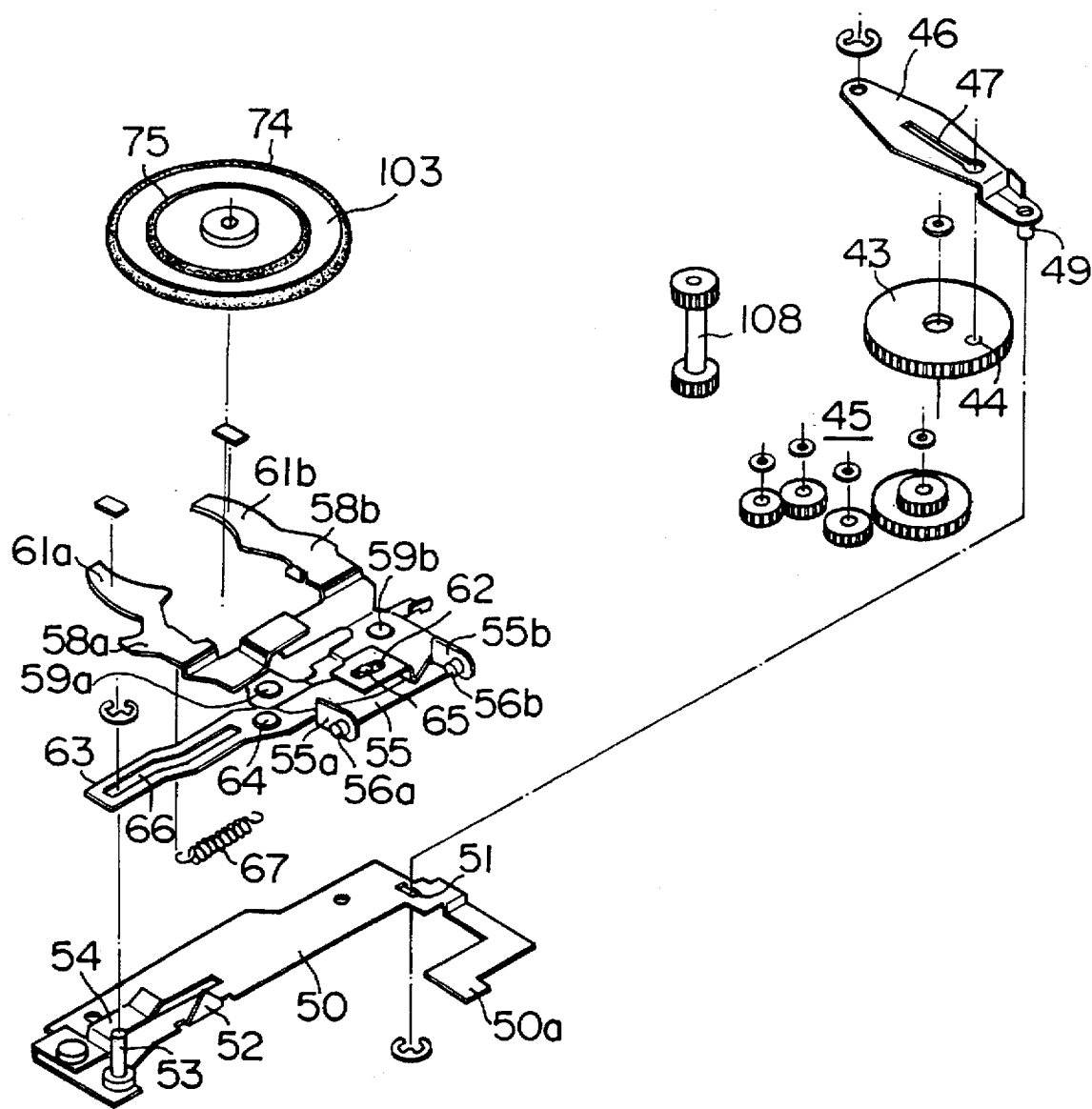
FIG. 11 is an exploded perspective view of the clamper drive mechanism.
Figure 12:
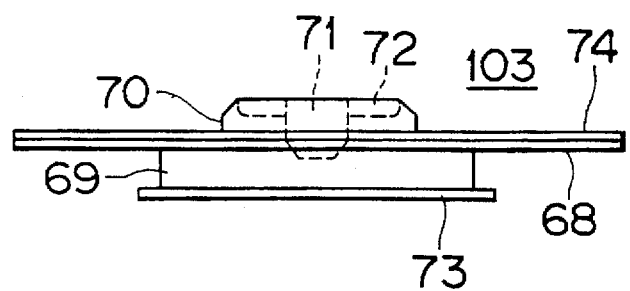
FIG. 12 is a side-elevational view of a clamper used in the disc player device.

FIG. 12 shows the clamper 103. The clamper 103 comprises an annular plate 68 of metal, and a cylindrical portion 69 fixedly secured to the central portion of the annular plate 68. A projection 70 is formed on the upper surface of the cylindrical portion 69 at the central portion thereof. A hole 71 is formed in the central portion of the projection 70, and an annular metal plate 72 is fixedly mounted on the edge portion of the hole 71. A flange 73 is formed on the lower end of the cylindrical portion 69. Rubber rings 74 and 75 are fixedly secured to the upper surface of the annular plate 68. The clamper drive mechanism 102 shown in FIGS. 9 to 11 serves to move the clamper 103 upward and downward. More specifically, the holder portions 61a and 61b of the pair of holder arms 58a and 58b hold therebetween that portion of the cylindrical portion 69 lying between the annular plate 68 and the flange 73, and lifts and lowers the clamper 103 (that is, moves it upward and downward in a direction perpendicular to the sheet of FIGS. 9 and 10).

Figure 14:
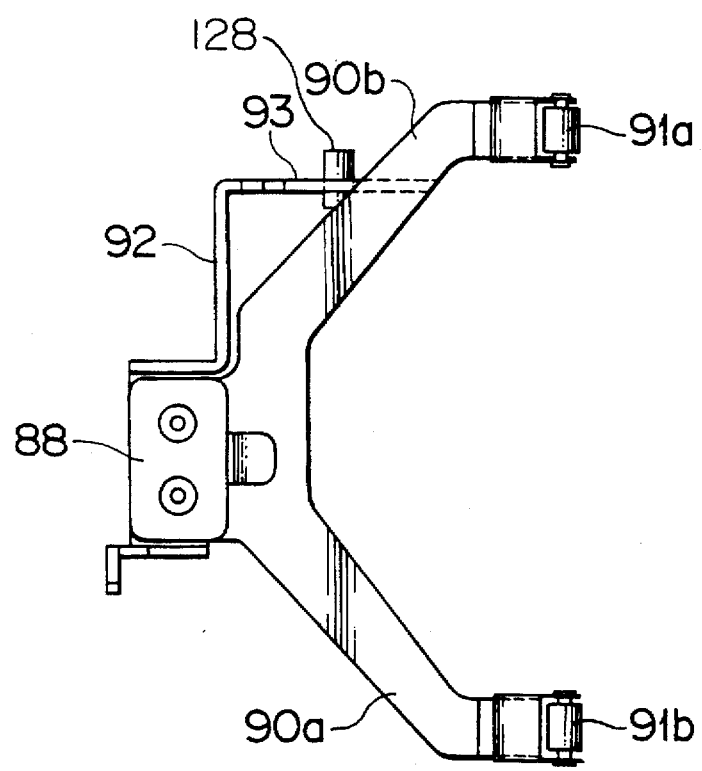
FIG. 14 is a top plan view of urging pieces of the disc player device.
Figure 15:
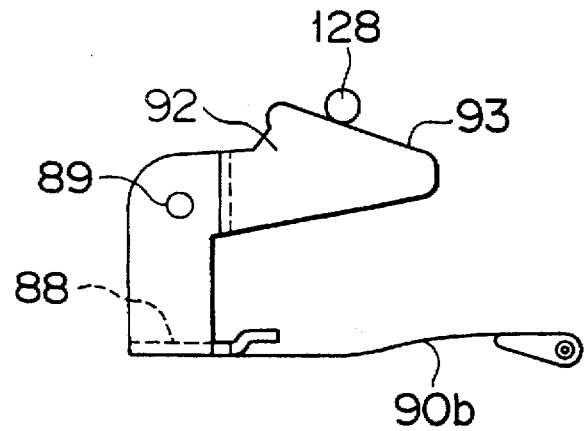
FIG. 15 is a side-elevational view of the urging piece.
Figure 13:
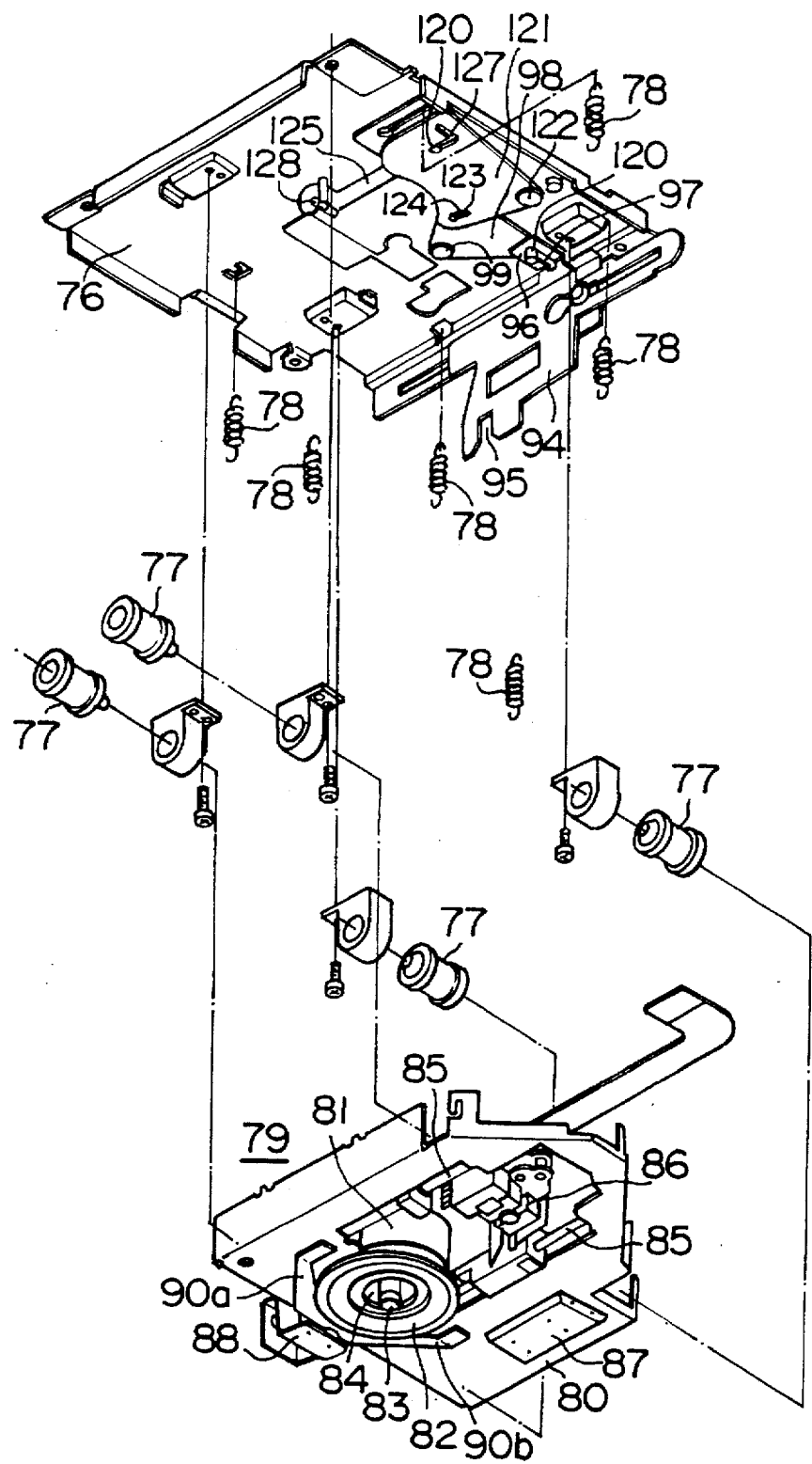
FIG. 13 is an exploded perspective view of a disc player portion of the disc player device.

FIG. 13 shows a disc player portion which is fixedly mounted at the upper right portion of the interior of the casing 1 of the disc player device shown in FIG. 1. The disc player portion comprises a chassis 76 fixedly mounted within the casing 1, and a pickup unit 79 supported on the chassis 76 by a plurality of clampers 77 and a plurality of springs 78. A motor 81 for rotating the compact disc is fixedly mounted on a base plate 80 of the pickup unit 79. The turntable 82 is fixedly mounted on a rotation shaft of the motor 81, and a projection 83 is formed on the central portion of the turntable 82, and a ring-shaped magnet 84 is fixedly received in a recess formed in the central portion of the turntable 82. Guide shafts 85 are fixedly mounted on the base plate 80 in parallel relation thereto, and the optical pickup 86 is slidably supported on the guide shafts 85. A motor 87 moves the optical pickup 86 along the guide shafts 85, and the optical pickup 86 is moved radially of the turntable 82 by the rotation drive force of the motor 87. A pivotal member 88 is pivotally mounted on the side of the base plate 80 by a shaft 89, and as shown in FIGS. 14 and 15, urging pieces 90a and 90b each composed of a leaf spring are fixedly secured to the pivotal member 88. Rollers 91a and 91b are rotatably supported respectively on the distal ends of the urging pieces 90a and 90b. An arm 92 is formed integrally with the pivotal member 88, and a cam surface 93 is formed on the distal end of this arm 92. The pivotal member 88 is urged by a spring (not shown) in a counterclockwise direction in FIG. 15.

Figure 9:
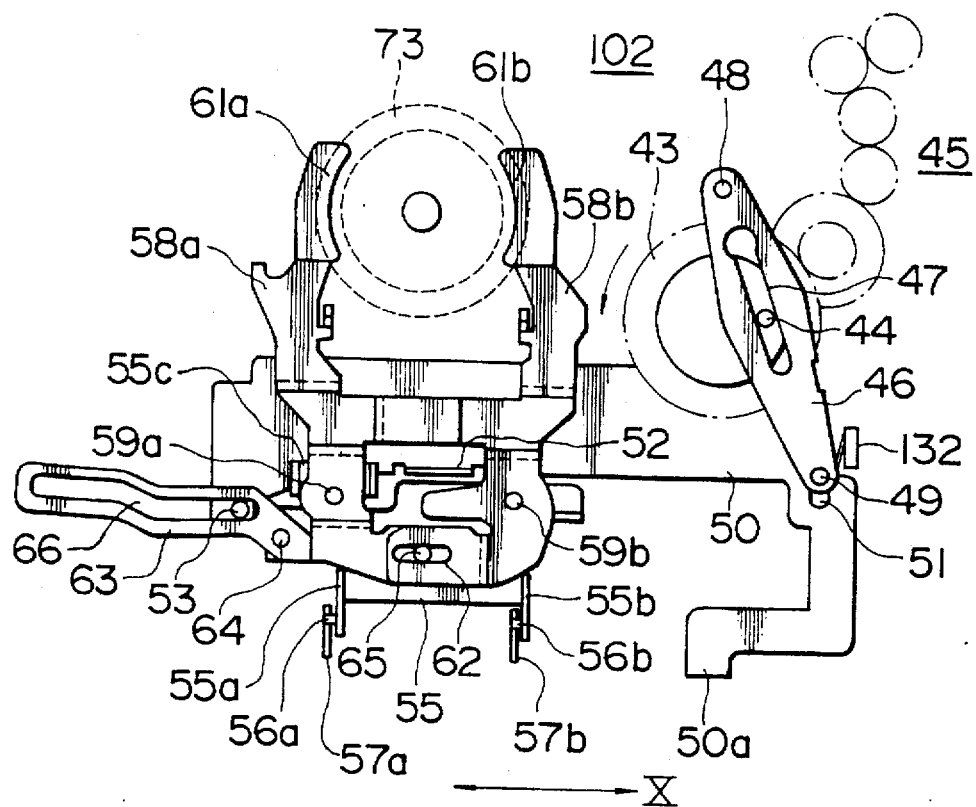
FIGS. 9 and 10 are a top plan view of a clamper drive mechanism of the disc player device.
Figure 10:
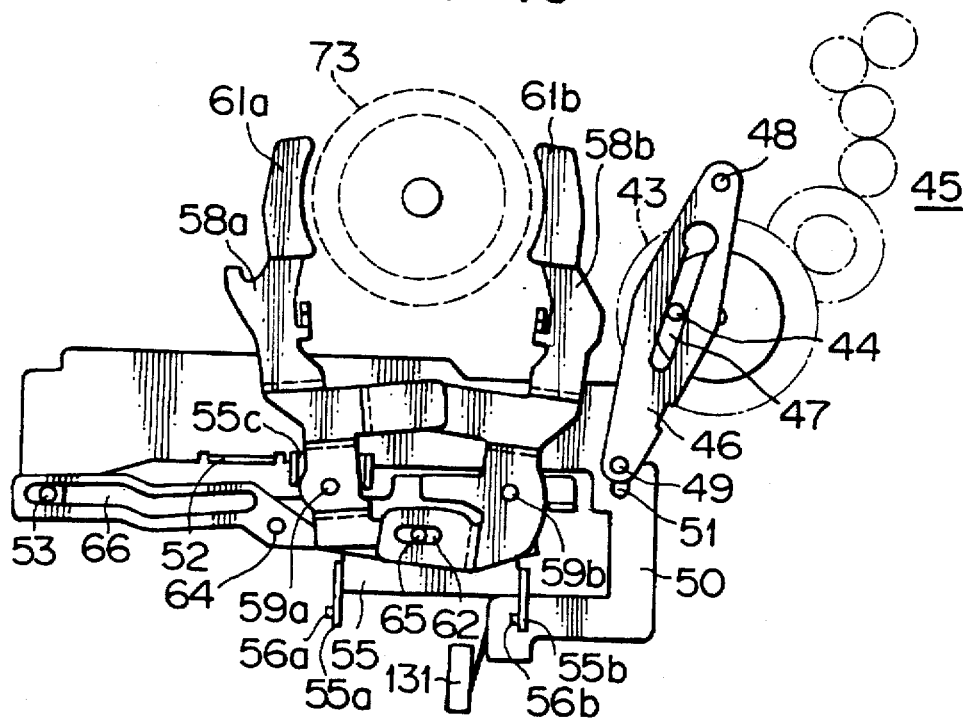

Referring to FIG. 13, a slide member 94 is slidably supported on a side plate of the chassis 76, and has a recess 95 in which a projection piece 50a of the slide plate 50 of the clamper drive mechanism shown in FIGS. 9 to 11 is engageable. A projection 96 is formed integrally with the slide member 94, and a slot 97 is formed through the projection 96. A pivotal arm 98 is pivotally supported by a shaft 99 on the chassis 76, and a pin 120 formed on the pivotal arm 98 is received in the slot 97 of the slide member 94. Thus, the slide member 94 and the pivotal arm 98 are connected together through the pin 120, and therefore when the slide member 94 slides, the pivotal arm 98 is pivotally moved about the shaft 99. A pivotal arm 121 is pivotally supported by a shaft 122 on the chassis 76, and a pin 124 formed on the pivotal arm 98 is received in a slot 123 formed through the pivotal arm 121. Thus, the pivotal arm 98 and the pivotal arm 121 are connected together through the pin 124, and when the pivotal arm 98 is pivotally moved, the pivotal arm 121 is also pivotally moved. A slider 125 is slidably supported on the chassis 76, and a pin 126 formed on the slider 125 is received in a slot 127 formed through the pivotal arm 121. Thus, the pivotal arm 121 and the slider 125 are connected together through the pin 126, and when the pivotal arm 121 is pivotally moved, the slider 125 slides. A drive pin 128 is formed on a bent portion formed on the distal end of the slider 125, and this drive pin 128 abuts against the cam surface 93 of the arm 92 shown in FIGS. 14 and 15.

In FIG. 13, when the slide member 94 slides, the pivotal arms 98 and 121 are pivotally moved, so that the slider 125 slides. When the slider 125 slides, the cam surface 93 shown in FIGS. 14 and 15 is driven by the drive pin 128, so that the pivotal member 88 is pivotally moved about the shaft 89, thereby pivotally moving the urging pieces 90a and 90b. The urging pieces 90a and 90b urge the compact disc on the clamper 103 during the upward transfer of the compact disc to the turntable 82 from the lower side thereof, and also urges the compact disc during the downward transfer of the compact disc from the turntable after the playback of the compact disc is finished. Thus, the urging pieces 90a and 90b serve to prevent the compact disc from being disengaged from the clamper 103 during the upward and downward transfer of the compact disc.

Figure 16:
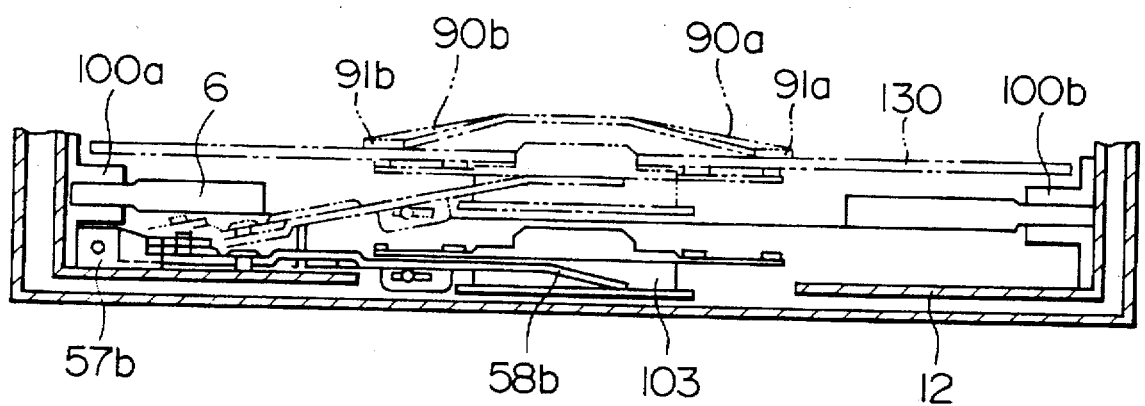
FIG. 16 is a view explanatory of the operation of the clamper drive mechanism.

Next, the operation of the clamper drive mechanism will now be described. The tray 6, drawn from the magazine body 4 shown in FIG. 2, is guided by the tray guide members 100a and 100b as shown in FIG. 16, and is supplied between the turntable 82 and the clamper drive mechanism. FIG. 9 shows the standby condition of the clamper transfer mechanism, and in this standby condition, the clamper 103 is held between the holder portions 61a and 61b of the holder arms 58a and 58b. As shown in FIG. 16, when the tray 6 is guided by the tray guide members 100a and 100b and is moved to a predetermined position, the elevated plate 12 moves upward to a predetermined position, and the projection piece 50a of the slide plate 50 of the clamper drive mechanism is engaged in the recess 95 in the slide member 94. In this condition, when electric current is supplied to the motor 104, the motor 104 rotates, and the rotation drive force of this motor 104 is transmitted to the gear 43 via the gear train 45 shown in FIG. 9, so that the gear 43 rotates counterclockwise. Since the eccentric pin 44 also rotates together with the gear 43, the pivotal arm 46 is pivotally moved clockwise about the shaft 48. When the pivotal arm 46 is thus pivotally moved clockwise, the slide plate 50, connected to the free end of the pivotal arm 46 by the pin 49, slides in the left-hand direction. When the slide plate 50 further slides in the left-hand direction, the triangular drive piece 52 formed integrally with the slide plate 50 is brought to a lower surface of a projection 55c of the pivotal base plate 55, and the projection 55c is pushed upward by the drive piece 52. As a result, the pivotal base plate 55 is pivotally moved about the shafts 56a and 56b. Since the holder arms 58a and 58b are pivotally mounted on the pivotal base plate 55, the clamper 103, held between the holder portions 61a and 61b of the holder arms 58a and 58b, is moved upward in response to the pivotal movement of the pivotal base plate 55. During the upward movement of the clamper 103, the projection 70 of the clamper 103 is inserted into the center hole of the compact disc 130, placed on the tray 6, from the lower side of the compact disc, and the lower surface of the compact disc 130 is urged by the rings 74 and 75 on the annular plate 68, so that the compact disc 130 is lifted from the tray 6 (see FIG. 16). At this time, the urging pieces 90a and 90b of the pivotal member 88 shown in FIGS. 14 and 15 are pivotally moved clockwise (FIG. 15) to press against the upper surface of the compact disc 130 placed on the clamper 103. Thus, the compact disc 130 is transferred upward in such a manner that the compact disc 130 is placed on the clamper 103 and urged by the urging pieces 90a and 90b. When the clamper 103 is further lifted, the central projection 83 of the turntable 82 is inserted into the hole 71 in the projection 70 of the clamper 103, and further the magnet 84 of the turntable 82 attracts the annular metal plate 72 of the clamper 103, so that the compact disc 130 is held between the turntable 82 and the clamper 103 by this magnetic attractive force. In the condition in which the compact disc is held between the turntable 82 and the clamper 103, the urging pieces 90a and 90b have been pivotally moved counterclockwise (FIG. 15), so that the rollers 91a and 91b are held out of contact with the compact disc.

In FIG. 9, as the slide plate 50 slides in the left-hand direction, the pin 53 formed on the slide plate 50 moves left along the bent slot 66 in the arm 63. During the time when the drive piece 52 of the slide plate 50 moves left in contact with the lower surface of the projection 55c of the pivotal base plate 55, the pin 53 reaches the bent portion of the bent slot 66. Therefore, the arm 63 is pivotally moved counterclockwise about the pin 64 by the pin 53 moving in the left-hand direction. Since the pin 65 formed on the end of the arm 63 is received in the slots 62 formed respectively in one ends of the holder arms 58a and 58b, the two holder arms 58a and 58b are driven by the pin 65 upon counterclockwise pivotal movement of the arm 63. More specifically, the holder arm 58a is pivotally moved counterclockwise about the shaft 59a whereas the holder arm 58b is pivotally moved clockwise about the shaft 59b, so that the holder portions 61a and 61b of the holder arms 58a and 59b are opened or moved away from each other to an extent larger than the diameter of the flange 73, thereby releasing the holding of the clamper 103 by the holder arms 58a and 58b.

When the slide plate 50 further slides in the left-hand direction, so that the distal end of the drive piece 52 begins to be disengaged left from the lower surface of the projection 55c of the pivotal base plate 55, the pivotal base plate 55 is pivotally moved about the shafts 56a and 56b toward the elevator plate 12, with the holder portions 61a and 61b of the holder arms 58a and 58b kept open. Thus, the holder arms 58a and 58b, which have held the clamper 103 therebetween and moved upward, move downward without holding the clamper 103 therebetween after the clamper 103 is attracted by the turntable 82.

Figure 17:
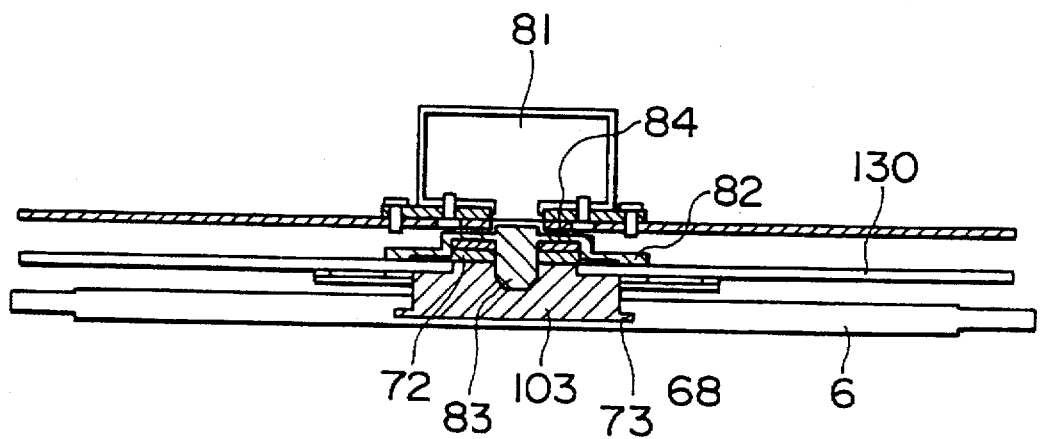
FIG. 17 is a side-elevational view showing a disc playback condition.

When the slide plate 50 further slide left to the position shown in FIG. 10, a switch 131 is activated by the slide plate 50 to de-energize the motor 104, thereby stopping the sliding movement of the slide plate 50. FIG. 10 shows the condition of the clamper drive mechanism at the time of the playback of the compact disc, and the holder arms 58a and 58b are held apart from the clamper 103, and are not mechanically contacted therewith at all. FIG. 17 shows the clamped condition of the compact disc 130 at the time of the playback of the compact disc.

Next, reference is now made to the operation for returning the compact disc to the tray 6 after the playback of the compact disc is finished. In the condition shown in FIG. 10, when the motor 104 is energized, the gear 43 is rotated counterclockwise by the rotation drive force of the motor 104, and the pivotal arm 46 is pivotally moved counterclockwise about the shaft 48, so that the slide plate 50 slides in the right-hand direction. Therefore, the drive piece 52 also moves in the right-hand, and when the drive piece 52 is brought to the lower surface of the projection 55c of the pivotal base plate 55, the pivotal base plate 55 is pivotally moved about the shafts 56a and 56b, so that the holder portions 61a and 61b of the holder arms 58a and 58b move upward. During the time when the drive piece 52 moves right with its distal end held in contact with the lower surface of the projection 55c, the pin 53 moving right along the bent slot 66 reaches the bent portion of this bent slot 66, so that the arm 63 is pivotally moved clockwise about the shaft 64. Therefore, the pin 65 formed on the arm 63 causes the holder arms 58a and 58b to pivotally move, so that the holder portions 61a and 61b move toward each other to hold the clamper 103 therebetween.

When the slide plate 50 further moves in the right-hand direction, so that the drive piece 52 is disengaged right from the lower surface of the projection 55c of the pivotal base plate 55, the pivotal base plate 55 is pivotally moved, so that the holder portions 61a and 61b of the holder arms 58a and 58, while holding the clamper 103 therebetween, move downward. Therefore, the clamper 103 is released from the attractive force of the magnet 84, and is disengaged from the turntable 82, and the clamper 103 having the compact disc 130 placed thereon moves downward, and places the compact disc 130 in the recess 8 of the tray 6. At this time, the urging pieces 90a and 90b are pivotally moved clockwise (FIG. 15) to press against the upper surface of the compact disc. When the slide plate 50 further slides right to reach the position shown in FIG. 9, the free end of the pivotal arm 46 activates a switch 132 to de-energize the motor 104, thereby stopping the sliding movement of the slide plate 50 in the right-hand direction. Thereafter, the tray 6 containing the compact disc is moved by the tray transfer mechanism, and is introduced into the magazine body 4.

Next, the switch mechanism 109 shown in FIG. 4 will now be described with reference to FIGS. 4 and 18 to 21. A metal member 140 to which the motor 104 is fixedly mounted is fixedly mounted on a base plate 142 fixedly secured by screws to a mounting portion 141 of the elevator plate 12. A worm gear 143 is fixedly mounted on the rotation shaft of the motor 104, and a helical gear 144 is rotatably mounted on a shaft formed on the base plate 142, and is in mesh with the worm gear 143. A gear 145 is rotatably mounted on a shaft formed on the base plate 142, and is in mesh with the helical gear 144. A shaft 146 is formed on the base plate 142, and a gear 147 is rotatably mounted on the shaft 146. The gear 147 has two gear portions 147a and 147b, and the gear portion 147a is in mesh with the gear 145. A pivotal lever 148 of a U-shape is pivotally mounted on the shaft 146, and a gear 149 is supported on the pivotal lever 148. A felt is interposed between the gear 149 and the pivotal lever 148, and a spring is received in a recess of the gear 149, and the urging force of this spring urges the gear 149 against the felt, thereby providing a friction mechanism. The gear 149 is always in mesh with the gear portion 147b of the gear 147. A projection 150 is formed at the end of the pivotal lever 148, and an internal gear 151 is fixedly mounted on the base plate 142. A drive piece 152 is pivotally mounted on the base plate 142, and is urged in one direction by a spring. The drive piece 152 has a recess 153 in which the pin 17 of the tray transfer mechanism 101 is engageable. A retaining pawl 154 is pivotally mounted on the base plate 142, and is urged in one direction by a spring 155. A portion of the retaining pawl 154 is bent to form a receiving portion 156. When the drive piece 152 is urged by the pin 17 to be pivotally moved, the drive piece 152 abuts against the receiving portion 156 of the retaining pawl 154 to pivotally move the retaining pawl 154. A retaining portion 157 is formed at the distal end of the retaining pawl 154, and this retaining portion 157 retains the projection 150 of the pivotal lever 148 to thereby limit the pivotal movement of the pivotal lever 148.

Figure 18:
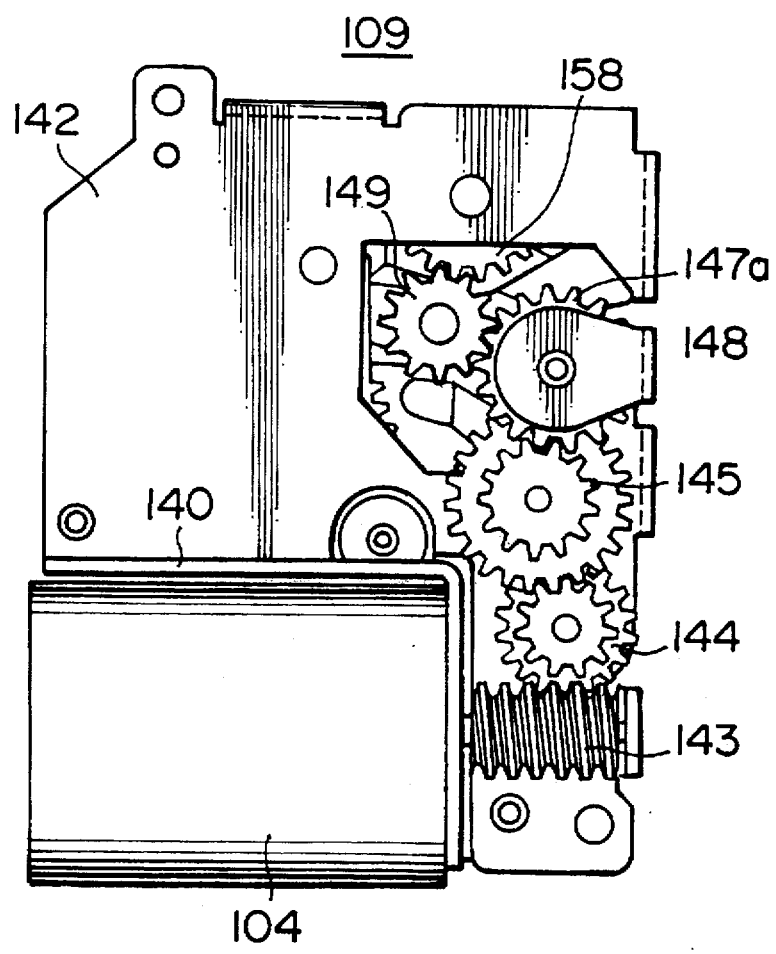
FIG. 18 is a top plan view of a switch mechanism of the disc player device in a tray-transferring condition.
Figure 19:
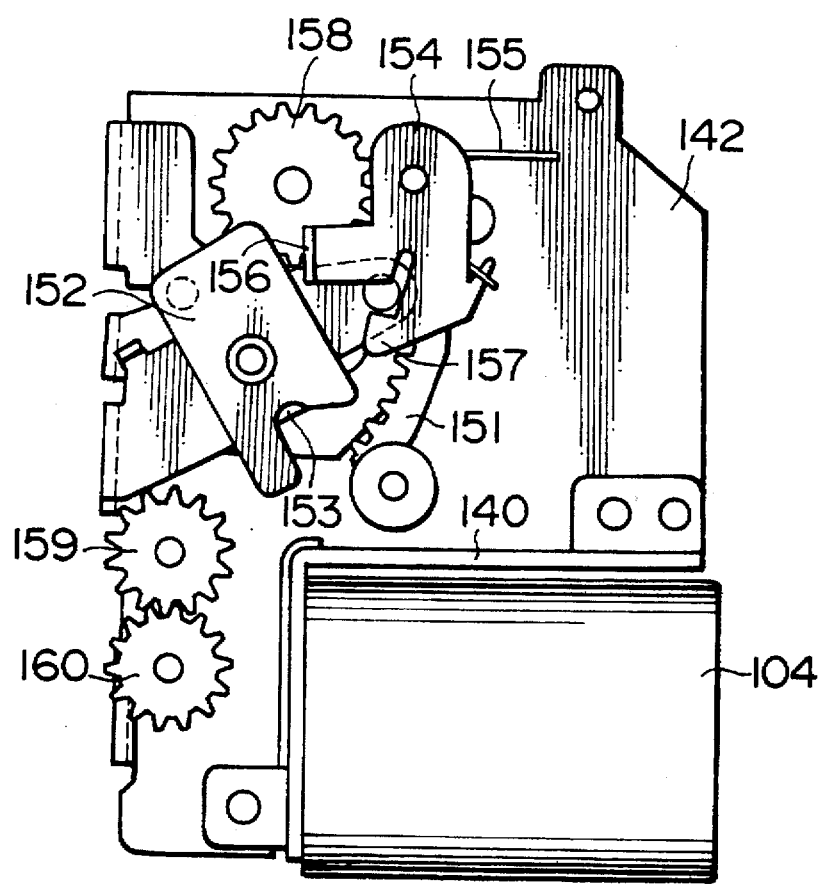
FIG. 19 is a bottom view of the switch mechanism in the tray-transferring condition.
Figure 20:
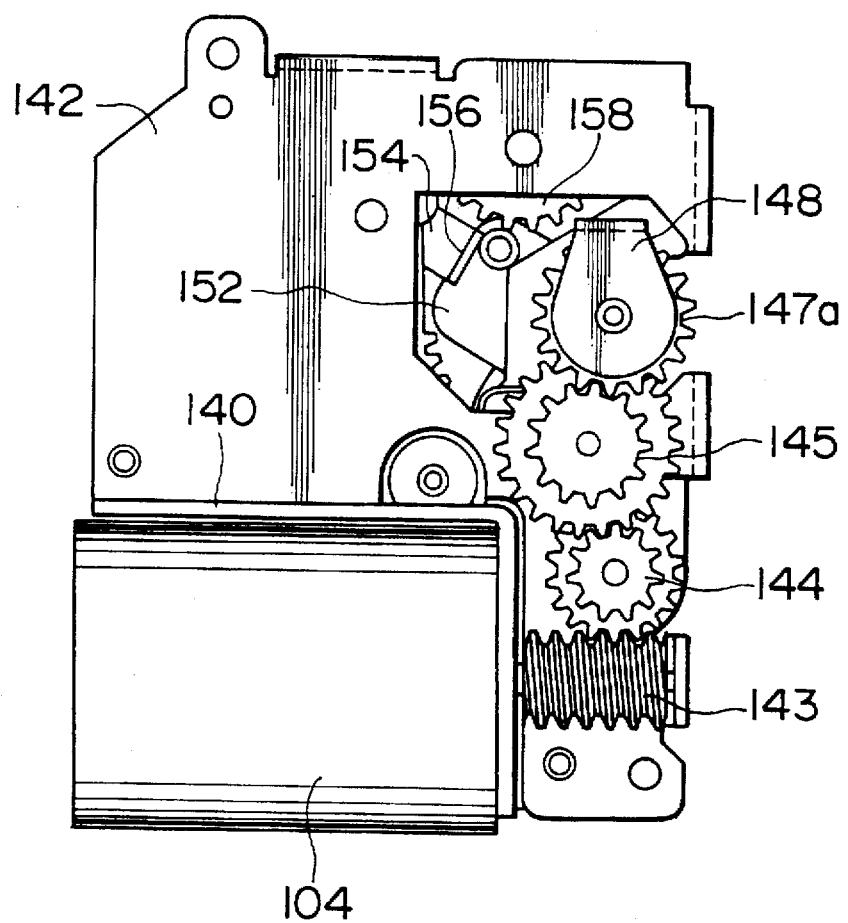
FIG. 20 is a top plan view of the switch mechanism in a clamper-driving condition.
Figure 21:
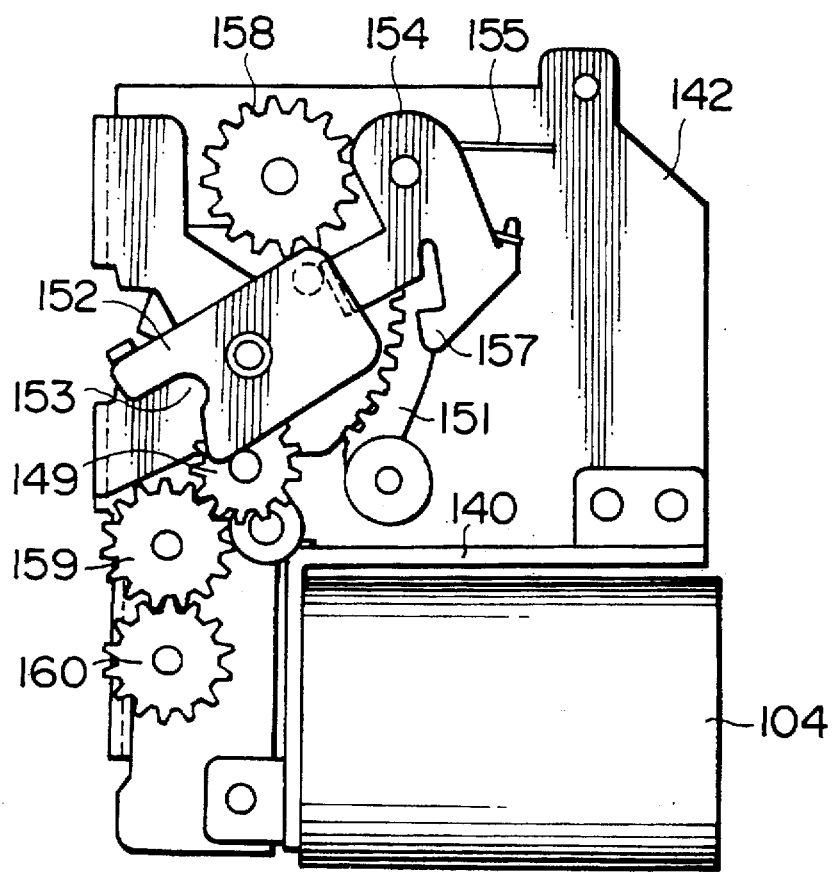
FIG. 21 is a bottom view of the switch mechanism in the clamper-driving condition.

FIGS. 18 and 19 show the condition of the switch mechanism 109 in which the rotation drive force of the motor 104 is transmitted to the tray transfer mechanism 101. In this condition, the rotation drive force of the motor 104 is transmitted to the gear 31 sequentially via the worm gear 143, the helical gear 144, the gear 145, the gear 147, the gear 149, a gear 158, the gear 105 and the gear train 14, so that the pin 17 is moved in the direction of arrow X as described above, thereby drawing the tray 6 from the magazine. In this tray transfer condition, because of the provision of the slip mechanism of the gear 149, the pivotal lever 148 tends to pivotally move so that the gear 149 may be disengaged from the gear 158, but since the projection 150 of the pivotal lever 148 is retained by the retaining portion 157 of the retaining pawl 154, the pivotal lever 148 does not pivotally move, and the rotation drive force of the gear 149 is transmitted to the gear 158, thereby continuing the transfer of the tray 6. When the pin 17 is further moved, the pin 17 is engaged with the recess 153 of the drive piece 152 of the switch mechanism 109 to pivotally move the drive piece 152, thereby pivotally moving the retaining pawl 154. When the retaining pawl 154 is pivotally moved, the retaining portion 157 of the retaining pawl 154, which has been disposed in a path of pivotal movement of the projection 150 of the pivotal lever 148, is brought out of the path of pivotal movement of the projection 150. Therefore, the pivotal lever 148 is pivotally moved, and the gear 148 is brought into meshing engagement with the gear 159 (FIGS. 20 and 21). At this time, the rotation of the motor 104 is stopped, and the elevator plate 12 moves upward to the predetermined position. When the elevator plate 12 arrives at the predetermined position, the motor 104 is again rotated in the same direction. Therefore, the rotation drive force of the motor 104 is transmitted to the gear 43 sequentially via the worm gear 143, the helical gear 144, the gear 145, the gear 147, the gear 149, the gear 159, a gear 160, the gear 106 and the gear train 45, so that the holding and releasing of the clamper 103 and the upward and downward movements of the clamper 103 are sequentially carried out as described above. After the playback is finished, the motor 104 is rotated in the reverse direction, and therefore the switch mechanism as well as the tray transfer mechanism performs the operation reverse to the above operation, thereby introducing the tray 6 into the magazine.

As described above, in the above embodiment, the clamper 103 is held between the holder arms 58a and 58b, and in this condition these holder arms 58a and 58b are moved upward to insert the clamper 103 into the hole 9 from the lower side of the tray 6. Then, the clamper 103 having the compact disc placed thereon is transferred to the turntable 82, and the clamper 103 is attracted to the turntable 82 by the magnetic attractive force to thereby hold the compact disc therebetween. Then, the holder arms 58a and 58b are moved away from each other to their open condition, and are moved downward. After the playback of the compact disc is finished, the holder arms 58a and 58b in their open condition are moved upward, and upon arrival at the clamper 103, the holder arms 58a and 58b are moved toward each other to again hold the clamper 103 therebetween, and the clamper 103 is disengaged from the turntable 82, and the holder arms 58a and 58b are moved downward together with the compact disc. During the playback of the compact disc, the clamper 103 is out of contact with the clamper transfer mechanism, and there is not formed a vibration loop by which the vibration of the optical pickup is transmitted to the compact disc via the clamper transfer mechanism, and therefore an oscillation phenomenon as experienced in the prior art is prevented, and the focus servo can be stably operated.

In the above embodiment, the holding and release of the clamper 103, as well as the upward and downward movements of the clamper 103, can be effected by the sliding movement of the slide plate 50, and therefore the clamper transfer mechanism is simple in construction. In the above embodiment, during the transfer of the compact disc from the tray 6 to the turntable 82 and also during the transfer of the compact disc from the turntable 82 to the tray 6, the urging pieces 90a and 90b hold the compact disc so as to prevent the compact disc from being disengaged from the clamper 103, and therefore the compact disc can be stably transferred.

According to a modified form of the invention, a positioning hole is formed in the center of the lower surface of the clamper 103 shown in FIG. 12, and a positioning pin for fitting in this hole is formed on the elevator plate 12. When the clamper 103 descends to its lower position, the positioning pin is fitted in the positioning hole to thereby position the clamper 103. With this arrangement, when the compact disc placed on the clamper is to be returned to the tray 6, the accuracy of positioning of the compact disc relative to the tray 6 is enhanced. Preferably, the distal end portion of the positioning pin has a conical shape.

In the above embodiment, by means of the switch mechanism 109 of a simple construction including the plurality of gears, the rotation drive force of the motor is transmitted to the tray transfer mechanism 101 or the clamper drive mechanism 102 to operate the same.

What is claimed is:

1. A disc player device comprising:

an elevator plate;

a slide plate slidably mounted on said elevator plate;

a pivotal member pivotally mounted on said elevator plate and pivotally move in response to the sliding movement of said slide plate so as to pivot toward and away from said elevator plate;

a clamper for supporting a disc thereon;

a pair of holder arms mounted on said pivotal member, said pair of holder arms being movable toward each other to hold said clamper therebetween, and movable away from each other to release said clamper; and a movable member mounted on said pivotal member for movement in response to the sliding movement of said slide plate, said movable member coupling said pair of holder arms to said pivotal member for moving said pair of holder arms toward and away from each other in response to sliding movement of said slide plate.

2. A disc player device comprising:

a clamper for supporting a disc thereon;

a turntable for attracting said clamper, transferred to said turntable, by a magnetic attractive force to thereby hold the disc between said clamper and said turntable;

holder arm means for clamping said clamper while said clamper is supporting a disc thereon:

clamper transfer means for transferring said holder arm means and said clamper clamped by said holder arm means to and from said turntable;

urging means for coming into contact with said disc and urging the disc against said clamper during the transfer of said clamper to said turntable by said clamper transfer means; wherein after said clamper transfer means clamps and transfers said clamper to said turntable, said clamper transfer means is disengaged from said clamper to be disposed out of contact therewith, and also said urging means is brought out of contact with the disc.

3. A disc player device according to claim 2, further comprising an elevator plate, and wherein said clamper transfer means includes:

a slide plate slidably mounted on said elevator plate;

a pivotal member pivotally mounted on said elevator plate and pivotally movable in response to the sliding movement of said slide plate so as to pivot toward and away from said elevator plate, said holder arm means being mounted on said pivotal member; and a movable member mounted on said pivotal member for movement in response to the sliding movement of said slide plate, said movable member coupling said holder arm means to said pivotal member for moving said holder arm means toward and away from each other in response to the sliding movement of said slide plate.

4. A device for playing a disc carried on a trays comprising:

an elevator plate;

a base plate pivotable about a first axis parallel to said elevator plate for movement towards and away from a disc tray positioned above said elevator plate;

a clamper for engaging a disc carried on the tray, said clamper having an upper surface for supporting the disc thereon;

a pair of holder arms pivotably mounted on said base plate for movement towards and away from each other between a closed position in which said clamper is retained by said holder arms and an open position in which said clamper is released by said holder arms, said pair of holder arms being pivotable about a second axis perpendicular to said elevator plate;

a slide plate slidably mounted on said elevator plate for movement in opposite first and second directions along a third axis parallel to said first axis;

holder arm movement means for moving said holder arms from said closed position to said open position in response to movement of said slide plate in said first direction and for moving said holder arms from said open position to said closed position in response to movement of said slide plate in said second direction; and base plate pivot means for pivoting said base plate towards the disc tray in response to movement of said slide plate in said first direction and for pivoting said base plate away from the disc tray in response to movement of said slide plate in said second direction;

whereby said clamper is brought into engagement with the disc and is released from said holder arms when said slide plate moves in said first direction and said base plate pivots towards the disc tray, and said clamper is taken out of engagement with the disc and is retained by said holder arms when said slide plate moves in said second direction and said base plate pivots away from the disc tray.

5. A disc player device according to claim 2, wherein said movable member is pivotally mounted on said pivot member for movement about a pivot axis perpendicular to said pivotal member.

6. A disc player device comprising:

an elevator plate;

a slide plate slidably mounted on said elevator plate;

a pivotal member pivotally movable in response to the sliding movement of said slide plate so as to pivot toward and away from said elevator plate;

a clamper for supporting a disc thereon, said clamper being movable between an upper and a lower position, said clamper in said upper position being held in place only by magnetic attraction from above said clamper;

a pair of holder arms mounted on said pivotal elevator plate, said pair of holder arms being movable toward each other to hold said clamper therebetween to move said clamper between said upper and lower positions, and movable away from each other to release said clamper when said clamper is in said upper position; and coupling means for coupling said pair of holder arms to said pivotal member for moving said pair of holder arms toward and away from each other in response to the sliding movement of said slide plate.

* * * * *